Patented Sept. 24, 1940

2,215,825

UNITED STATES PATENT OFFICE 2,215,825

CORE BINDER

Benjamin F. Wallace and Burgess P. Wallace, Brooklyn, N. Y.; said Benjamin F. Wallace assignor to Matilda Wallace and said Burgess P. Wallace, both of Brooklyn, N. Y., jointly No Drawing. Application March 16, 1938, Serial No. 196,151

4 Claims. (Cl. 22—188)

This invention relates to sand cores for use in the casting of metals and has for its particular objects the expeditious and economical production of such cores as well as the minimizing of the evolution of acrid fumes during such production. Further objects of the invention comprise the production of a core having a "green bond" or unbaked strength adequate to enable it to maintain its shape during the baking operation and which core when baked is sufficiently strong to be unaffected by the action of the flowing metal during a casting operation and yet can be readily disintegrated and removed from the completed casting.

Still other objects of the invention comprise the utilization in the production of such cores of a non-oleaginous, highly water-soluble base ingredient which comprises either a molasses, such for example as black strap molasses, an uncrystallizable sugar, such as glucose and dextrose, a starch or dextrine, a sulphite pulp waste liquor, i. e. goulac or glutrin, and like products which readily reduce Fehling's solution and which are of themselves highly water-soluble. Further objects of the invention will hereinafter appear.

At the present time in the production of foundry cores it is customary to employ a core oil as a binder and which oil is essentially water-soluble. This oil binder not only requires the employment of a high temperature for the baking of the core, but during the baking operation yields a voluminous amount of acrid smoke or fumes. Such binders are also relatively expensive and they do not possess the inherent property of causing the sand particles to cohere to each other during the initial mixing of the sand and binder together and prior to the baking of the formed core.

In carrying out our invention, we preferably proceed as follows:

113 parts of sulphate of ammonia and 1100 parts of black strap molasses are first dissolved in 275 parts of water while constantly agitating the mixture. Then 120 parts of a water-soluble glycerol-citric-acid resin, prepared as hereinafter described, is added and the mixture is thoroughly agitated until the resin is completely dissolved therein.

Due to the tendency of the molasses and the resin-like element of the aforesaid mixture to migrate to the surface of the core during the baking operation, an emulsion consisting of 265 parts of Chinese wood oil (tung oil) and 15 parts of karaya gum dissolved in 140 parts of water is then added with constant stirring to the foregoing mixture. Then to the resultant mass a preservative, preferably about 15 parts of beta naphthol, is added also with constant stirring until the same is completely dissolved therein.

The foregoing glycerol-citric-acid resin is prepared by mixing equal parts of glycerine and citric acid and heating to a temperature of approximately 220° C. for a sufficient time to partially condense the resin and effect the evaporation of the water of condensation formed during the reaction. If desired, however, in lieu of adding the partially polymerized resin to the molasses base as aforesaid, the same quantities of glycerine and citric acid may be incorporated directly into the mixture and the desired resin will be formed in situ therein during the baking operation.

In order to produce a core employing the foregoing binder, approximately 30 to 60 parts of green sand are mixed with one part of our improved binder and a core of the desired shape is then molded therefrom. Then the same is baked in an oven at a temperature preferably between 180° C. to 300° C., such baking operation continuing preferably until the core is thoroughly baked throughout. The resultant core is highly water-insoluble and a specimen thereof if submerged in water for 24 hours will show no discoloration of the water and, when removed from the water and allowed to dry, will be found to be unaffected by such submersion.

The ammonium sulphate during the baking of the core reacts with the molasses to form a black resin-like substance or magma which is essentially substantially water-insoluble and, due to the partial migration of the molasses, and the glycerol-citric-acid resin during the baking operation, the shell of the core becomes transformed into an unusually tough and water-insoluble shell which is entirely resistant to and unaffected by the action of the molten metal. The function of the drying oil and gum emulsion is to bind together the sand particles and thereby reinforce the inner portion of the core which would otherwise be unduly weakened by such partial migration of the molasses and glycerol-citric-acid resin, prior to the conversion of the same into an insoluble condition, to the outer layer of the core.

While we preferably employ ammonium sulphate as the agent for rendering insoluble the molasses or like water-soluble, reducible base, other compounds having similar properties, such as for example sulphuric acid, ammonium alum, ammonium phosphate, chloride or persulphate, and which compounds on heating produce an acid-reacting substance, may be substituted therefor.

Also in lieu of a glycerol-citric-acid resin, a mixture of either tartaric, malic, fumaric, succinic or like fruit acids with glycerine may be substituted, the same being either introduced into the molasses or like water-soluble base without being previously heated or being heated prior to such introduction to partially condense the same without objectionably affecting the solubility thereof.

Such compounds as sodium borate, caustic soda and like substances which have an alkaline reaction are entirely unsuited for use with molasses or like water-soluble base in the production of our improved binder.

While we prefer tung oil, owing to its characteristic property of polymerizing to a jelly-like mass when heated, other drying oils, such for example as linseed, soya bean or perilla may be used in lieu thereof.

The karaya gum, which may be substituted by other water-soluble gums, as for example gum arabic and gum tragacanth, or by gelatin, serves to facilitate the formation of a better and more permanent emulsion than is obtainable when water and a drying oil are emulsified alone. The function of the aqueous oil-gum emulsion, in addition to that above described, is to render the baked core even more water-insoluble than if the same were omitted from the core binder.

In foundry operations, it is often customary to store sand cores after the same are baked for considerable periods before use for metal casting purposes and while so stored the cores are exposed to the prevailing atmospheric moisture. Also it is customary to insert the baked cores into position in a mold wherein such cores are frequently allowed to remain overnight in contact with the moist molding sand. Accordingly, the characteristic of being water-insoluble and thereby being unaffected by atmospheric moisture or moist sand is of no inconsiderable importance in the case of a baked sand core for use in such operations.

Preferably we employ an ammonium salt of a poly-basic, difficultly volatile, mineral acid, as the agent for converting to an insoluble magma the molasses, or like base, such as hereinbefore defined.

Various changes in proportions and the details of manufacture from that herein described may be made without departing from the spirit of our invention as embraced within the scope of the appended claims.

Having thus described our invention, what we claim and desire to obtain by United States Letters Patent is:

1. A sand core for use in casting metal, comprising the product obtained by baking a mixture consisting essentially of sand, a minor proportion of molasses, a relatively small quantity of a member of a group consisting of an ammonium sulphate, ammonium alum, sulphuric acid, ammonium phosphate and ammonium citrate capable of forming an acid-reacting substance when heated to a baking temperature, a mixture of water-soluble compounds, which mixture is capable, when isolated, of itself forming a water-insoluble resinous condensation product, together with a stabilized emulsion comprising a drying oil and water.

2. A binder for making cores for metal castings, the same being composed principally of molasses, which binder also contains a relatively small quantity of a member of a group, consisting of an ammonium sulphate, ammonium alum, sulphuric acid, ammonium phosphate and ammonium citrate, capable of forming an acid-reacting substance when heated to a baking temperature and which binder also contains a mixture of water-soluble compounds, which mixture if isolated, is capable of itself forming a water-insoluble resinous condensation product when heated to a baking temperature, besides containing a stabilized emulsion comprising a drying oil and water and a relatively minute proportion of a preservative for preventing fermentation of the molasses.

3. A water-insoluble sand core for use in casting metal, comprising the product obtained by baking a mixture consisting essentially of sand, a minor proportion of molasses, a relatively small quantity of ammonium sulphate, a water-soluble partially condensed glycerol-citric-acid resin and a stabilized emulsion comprising a drying oil and water.

4. A binder for making cores for metal castings, the same being composed principally of molasses and which binder also contains a relatively small quantity of a member of a group, consisting of an ammonium sulphate, ammonium alum, sulphuric acid, ammonium phosphate and ammonium citrate, capable of forming an acid-reacting substance when heated to a baking temperature, said binder also containing a mixture of water-soluble compounds, including a resinous compound, which mixture, if isolated, is itself capable of forming a water-insoluble resinous condensation product when heated to a baking temperature, said binder also containing a stabilized emulsion of a drying oil and water and being characterized by its ability, when admixed with a large quantity of sand and heated to a baking temperature, to form a water-insoluble core that is highly resistant to molten metal when utilized in a casting operation.

BENJAMIN F. WALLACE.
BURGESS P. WALLACE.